US010012090B2

(12) United States Patent
Slavens et al.

(10) Patent No.: US 10,012,090 B2
(45) Date of Patent: Jul. 3, 2018

(54) AIRFOIL COOLING APPARATUS

(71) Applicant: United Technologies Corporation, Hartford, CT (US)

(72) Inventors: Thomas N. Slavens, Vernon, CT (US); Brooks E. Snyder, Glastonbury, CT (US); Andrew D. Burdick, Somers, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 285 days.

(21) Appl. No.: 14/804,865

(22) Filed: Jul. 21, 2015

(65) Prior Publication Data
US 2016/0024938 A1 Jan. 28, 2016

Related U.S. Application Data

(60) Provisional application No. 62/028,853, filed on Jul. 25, 2014.

(51) Int. Cl.
*F01D 5/18* (2006.01)

(52) U.S. Cl.
CPC .......... *F01D 5/187* (2013.01); *F05D 2220/32* (2013.01); *F05D 2240/303* (2013.01); *F05D 2250/322* (2013.01); *F05D 2260/2212* (2013.01); *Y02T 50/676* (2013.01)

(58) Field of Classification Search
CPC . F01D 5/187; F01D 5/18; F01D 5/147; F01D 5/148; F01D 5/186; F05D 2220/32; F05D 2240/303; F05D 2250/322; F05D 2260/2212; Y02T 50/676

USPC ................................................ 416/1, 97 R
See application file for complete search history.

(56) References Cited

U.S. PATENT DOCUMENTS

| | | | | |
|---|---|---|---|---|
| 3,370,829 A | * | 2/1968 | Banthin | F01D 5/187 415/115 |
| 4,416,585 A | * | 11/1983 | Abdel-Messeh | F01D 5/187 415/115 |
| 4,514,144 A | * | 4/1985 | Lee | B22C 9/04 416/96 R |
| 4,775,296 A | * | 10/1988 | Schwarzmann | F01D 5/187 415/115 |
| 4,786,233 A | * | 11/1988 | Shizuya | F01D 5/187 416/90 R |
| 5,395,212 A | * | 3/1995 | Anzai | F01D 5/187 415/115 |

(Continued)

FOREIGN PATENT DOCUMENTS

WO  9615358  5/1996

OTHER PUBLICATIONS

Extended European Search Report for Application No. 15177819.8 dated Dec. 21, 2015.

*Primary Examiner* — Kenneth Bomberg
*Assistant Examiner* — Brian Delrue
(74) *Attorney, Agent, or Firm* — Carlson, Gaskey & Olds, P.C.

(57) ABSTRACT

An airfoil for a gas turbine engine, the airfoil includes a wall that has a leading edge and a trailing edge and at least partially defining a boundary of a leading edge cavity radially along the leading edge. A cooling jet structure is operatively associated with a portion of the wall proximate the leading edge and is configured to direct a cooling fluid tangent to the portion of the wall.

19 Claims, 2 Drawing Sheets

(56) References Cited

U.S. PATENT DOCUMENTS

| | | | |
|---|---|---|---|
| 5,462,405 A | 10/1995 | Hoff et al. | |
| 5,511,309 A * | 4/1996 | Beabout | F01D 5/187 29/889.72 |
| 5,603,606 A * | 2/1997 | Glezer | F01D 5/187 415/115 |
| 5,711,650 A | 1/1998 | Tibbott et al. | |
| 5,902,093 A * | 5/1999 | Liotta | F01D 5/187 415/115 |
| 5,967,752 A | 10/1999 | Lee et al. | |
| 5,993,156 A * | 11/1999 | Bailly | F01D 5/187 415/115 |
| 6,206,638 B1 * | 3/2001 | Glynn | F01D 5/186 415/115 |
| 6,431,832 B1 * | 8/2002 | Glezer | F01D 5/187 416/97 R |
| 6,533,547 B2 * | 3/2003 | Anding | F01D 5/188 416/241 R |
| 6,547,525 B2 * | 4/2003 | Haehnle | B22C 9/10 415/115 |
| 6,634,858 B2 * | 10/2003 | Roeloffs | F01D 5/186 29/889.721 |
| 6,672,836 B2 * | 1/2004 | Merry | F01D 5/187 415/178 |
| 6,874,987 B2 | 4/2005 | Slinger et al. | |
| 7,163,373 B2 * | 1/2007 | Liang | F01D 5/18 415/115 |
| 7,278,826 B2 | 10/2007 | Blaskovich et al. | |
| 7,513,739 B2 * | 4/2009 | Boury | F01D 5/187 415/115 |
| 7,780,414 B1 * | 8/2010 | Liang | B22C 9/10 164/369 |
| 7,824,156 B2 * | 11/2010 | Dellmann | F01D 5/187 416/96 R |
| 7,866,947 B2 * | 1/2011 | Pietraszkiewicz | F01D 5/186 416/96 R |
| 8,083,485 B2 * | 12/2011 | Chon | F01D 5/187 416/97 R |
| 8,366,395 B1 | 2/2013 | Liang | |
| 8,757,974 B2 * | 6/2014 | Propheter-Hinckley | F01D 5/186 416/97 R |
| 8,790,083 B1 * | 7/2014 | Liang | F01D 5/186 416/97 R |
| 9,051,841 B2 * | 6/2015 | Janke | F01D 5/187 |
| 2002/0051706 A1 * | 5/2002 | Haehnle | B22C 9/10 416/97 R |
| 2004/0096313 A1 | 5/2004 | Harvey et al. | |
| 2005/0265840 A1 * | 12/2005 | Levine | F01D 5/187 416/97 R |
| 2005/0265844 A1 * | 12/2005 | Levine | F01D 5/187 416/97 R |
| 2006/0275118 A1 * | 12/2006 | Lee | F01D 5/188 416/97 R |
| 2007/0128034 A1 * | 6/2007 | Lee | F01D 5/187 416/97 R |
| 2009/0068022 A1 * | 3/2009 | Liang | F01D 5/187 416/97 R |
| 2009/0074575 A1 | 3/2009 | Propheter-Hinckley et al. | |
| 2010/0047078 A1 * | 2/2010 | Townes | F01D 5/186 416/97 R |
| 2010/0221123 A1 * | 9/2010 | Pal | F01D 5/189 416/97 R |
| 2013/0156601 A1 | 6/2013 | Propheter-Hinckley | |
| 2013/0230407 A1 * | 9/2013 | Boyer | F01D 5/186 416/97 R |
| 2013/0280092 A1 | 10/2013 | Xu | |
| 2014/0010632 A1 | 1/2014 | Spangler et al. | |
| 2014/0010666 A1 | 1/2014 | Hudson et al. | |
| 2014/0060084 A1 | 3/2014 | Gregg et al. | |
| 2014/0169962 A1 * | 6/2014 | Lee | F01D 5/186 416/1 |
| 2014/0199177 A1 * | 7/2014 | Propheter-Hinckley | F01D 5/187 416/97 R |

* cited by examiner

AIRFOIL COOLING APPARATUS

CROSS-REFERENCE TO RELATED APPLICATIONS

This application claims priority to U.S. Provisional Application No. 62/028,853, which was filed on Jul. 25, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In the pursuit of ever high efficiencies, gas turbine engine manufacturers have long relied on high turbine inlet temperatures to provide boosts to overall engine performance. In typical modern gas turbine engine applications, the gas path temperatures within the turbine section exceed the melting point of the component constituted materials. In order to operate the gas turbine engine at these temperatures, dedicated cooling air is extracted from the compressor section and used to cool the gas path components in the turbine section. The use of compressed air from the compressor section for cooling purposes decreases the efficiency of the gas turbine engine because the compressor section must produce more compressed air than is necessary for combustion. Therefore, minimizing the use of cooling air in the turbine section is of particular importance.

Typically, the leading edge region of a turbine airfoil experiences the highest heat load of the entire airfoil. The heat transfer coefficients located at the stagnation point of the airfoil are typically 1.5-2 times the values seen on the downstream portions of the airfoil. Due to the elevated heat loading at the stagnation point, airfoil cooling configurations are typically setup to produce the highest cooling effectiveness in this location, which in turn consumes one of the largest amounts of compressed air from the compressor section.

Turbine airfoil leading edge cooling configurations which utilize a highly convective impingement cavity feeding multiple rows of film holes can incur a relatively high pressure drop across the impingement holes. This pressure drop can lead to conditions where the circuit cannot positively purge the film holes leading to hot gas ingestion. As a result, compromises in back-side cooling effectiveness are made to mitigate this loss in pressure, such as over-sizing the impingement holes which decrease the impingement jet velocity and the overall impingement heat transfer efficiency. Thus, new and improved cooling configurations for airfoils which allow for significant heat transfer coefficient production while minimizing prohibitive pressure losses are desired in the art.

SUMMARY

In one exemplary embodiment, an airfoil for a gas turbine engine, the airfoil includes a wall that has a leading edge and a trailing edge and at least partially defining a boundary of a leading edge cavity radially along the leading edge. A cooling jet structure is operatively associated with a portion of the wall proximate the leading edge and is configured to direct a cooling fluid tangent to the portion of the wall.

In a further embodiment of the above, at least one dividing wall separates the leading edge cavity into multiple segments and is configured to minimize radial flow of the cooling fluid through the leading edge cavity.

In a further embodiment of any of the above, at least one dividing wall is generally perpendicular to the radial direction of the airfoil.

In a further embodiment of any of the above, the cooling jet structure includes a protrusion that is operatively disposed opposite the portion of the wall to form a channel therebetween configured to accelerate flow of the cooling fluid.

In a further embodiment of any of the above, the portion of the wall includes a concave portion about the leading edge.

In a further embodiment of any of the above, the concave portion follows a profile of the leading edge.

In a further embodiment of any of the above, the wall at least partially defines a boundary of a radially extending feed cavity in fluid communication with the channel.

In a further embodiment of any of the above, the cooling jet structure includes an inlet adjacent the radial feed cavity and an outlet adjacent the leading edge cavity.

In a further embodiment of any of the above, the wall defines at least one film hole therethrough fluidly coupled to the leading edge cavity.

In a further embodiment of any of the above, a pressure side cooling circuit extends along a pressure side of the airfoil. A suction side cooling circuit extends along a suction side of the airfoil. A trailing edge cooling circuit extends along a trailing edge of the airfoil.

In a further embodiment of any of the above, a central wall divides the pressure side cooling circuit from the suction side cooling circuit.

In another exemplary embodiment, a gas turbine engine assembly includes a rotor that is configured to rotate about an axis of rotation. An airfoil includes a wall that has a leading edge and a trailing edge and at least partially defines a boundary of a leading edge cavity radially along the leading edge. A cooling jet structure is operatively associated with a portion of the wall proximate the leading edge and is configured to direct a cooling fluid tangent to the portion of the wall.

In a further embodiment of the above, at least one dividing wall separates the leading edge cavity into multiple segments and is configured to minimize radial flow of the cooling fluid through the leading edge cavity. At least one dividing wall is generally perpendicular to the radial direction of the airfoil.

In a further embodiment of any of the above, the cooling jet structure includes a protrusion that is operatively disposed opposite the portion of the wall to form a channel therebetween that is configured to accelerate flow of the cooling fluid.

In a further embodiment of any of the above, the wall at least partially defines a boundary of a radially extending feed cavity in fluid communication with the channel.

In a further embodiment of any of the above, the cooling jet structure includes an inlet adjacent the radial feed cavity and an outlet adjacent the leading edge cavity.

In another exemplary embodiment, a method of cooling an airfoil in a gas turbine engine includes directing a cooling fluid in a direction tangential to a portion of a wall of a leading edge cavity that extends along a leading edge of the airfoil.

In a further embodiment of any of the above, the method includes separating the leading edge cavity into multiple segments that are configured to minimize radial flow of the cooling fluid through the leading edge cavity with at least one dividing wall. The dividing wall extends generally perpendicular to the radial direction of the airfoil.

In a further embodiment of any of the above, the portion of the wall includes a concave portion about the leading edge.

In a further embodiment of any of the above, the method includes directing the cooling fluid with a cooling jet structure. The cooling jet structure includes a protrusion that is operatively disposed opposite the portion of the wall to form a channel therebetween that is configured to accelerate flow of the cooling fluid.

The various features and advantages of this disclosure will become apparent to those skilled in the art from the following detailed description. The drawings that accompany the detailed description can be briefly described as follows.

DETAILED DESCRIPTION

Figure 1:
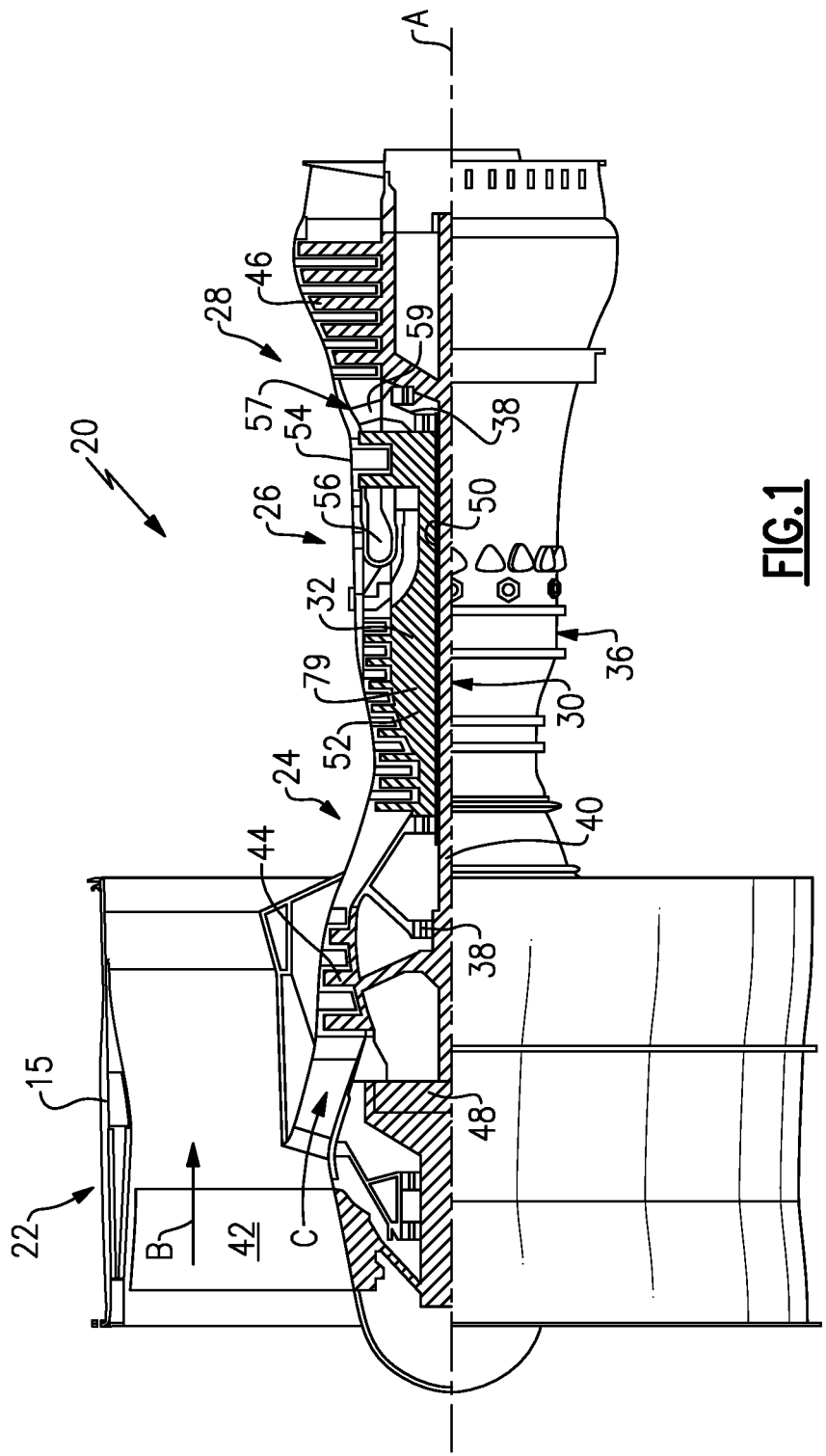
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
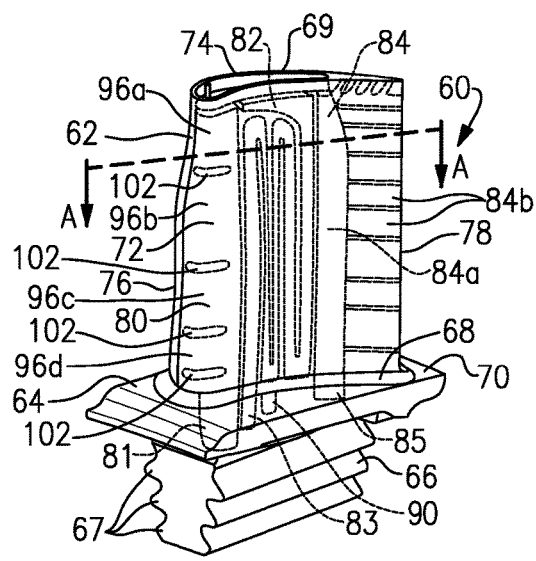
FIG. 2 illustrates an example airfoil structure.

FIG. 2 illustrates an example airfoil structure 60 including an airfoil 62, a platform 64, and optionally a root portion 66. In the illustrated example, the airfoil structure 60 is a turbine blade. The airfoil 62 includes a pressure side 72 and a suction side 74 separated by a leading edge 76 and a trailing edge 78. The pressure side 72 of the airfoil structure 60 is generally concave and the opposing suction side 74 is generally convex. A first airfoil end 68 is rigidly attached to a radially outer side 70 of the platform 64 and a second airfoil end 69 is spaced from the platform 64. In this disclosure, radial or radial direction is relative to the engine axis A unless otherwise specified.

The platform 64 forms a radially inner boundary layer for gas path traveling over the airfoil structure 60. The root portion 66 extends radially inward from the platform 64 to retain the airfoil structure 60 to a rotor 79 (FIG. 1). The root portion 66 is located on an opposite side of the platform 64 from the airfoil 62 and includes ribs 67 for engaging complimentary shaped receptacles on the rotor 79.

Figure 3:
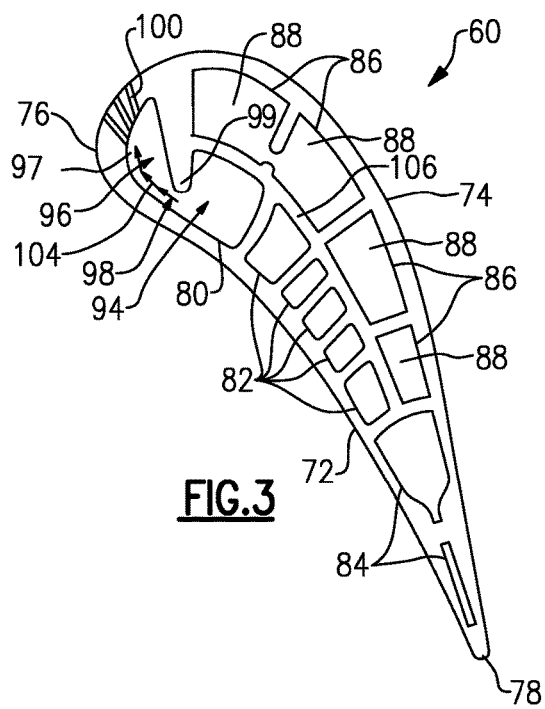
FIG. 3 illustrates a cross-section of the airfoil structure taken along line AA of FIG. 2.

As shown in FIGS. 2 and 3, the airfoil structure 60 is cooled with a leading edge cooling circuit 80, a pressure side cooling circuit 82, a trailing edge cooling circuit 84, and a suction side cooling circuit 86.

The leading edge cooling circuit 80 is located adjacent the leading edge 76 of the airfoil 62. The leading edge cooling circuit 80 extends partially along the suction side 74 past the leading edge 76 and partially onto the pressure side 72. An inlet 81 is in fluid communication with bleed air from the compressor section 24. The inlet 81 directs cooling fluid, such as air, through the root portion 66 and the platform 64 of the airfoil structure 60 into the leading edge cooling circuit 80.

The leading edge cooling circuit 80 includes a radial feed cavity 94 that extends substantially the radial length of the airfoil 62 and feeds cooling fluid to a leading edge cavity 96 through a cooling jet 98. The leading edge cavity 96 is divided into multiple segmented cavities 96a, 96b, 96c, and 96d that are fluidly separated by radial dividing walls 102 (shown in phantom). The segmented cavities 96a, 96b, 96c, and 96d extend in a radial direction and include a first wall 97 having a concave profile generally following a profile of a region surrounding the leading edge 76.

The cooling jet 98 is at least partially defined by a protrusion 99 extending from a central wall 106 and the first wall 97 to form a channel. The cooling jet 98 directs the cooling fluid with an initial velocity tangential to the concavity of the first wall 97 of the leading edge cavity 96. Due to the local acceleration provided by the cooling jet 98, the boundary layer of the cooling flow becomes disturbed at this point along the first wall 97 dramatically increasing the coolant-side heat transfer in the region of the leading edge 76. The coolant-side heat transfer is increased because the flow of cooling fluid is accelerated by the cooling jet 98 and turned by the curvature of the first wall 97 which further locally accelerates the flow keeping the boundary layer thickness development low and introduces higher heat transfer rates. By keeping the boundary layer thickness low, the local temperature gradient along the first wall 97 is also low.

Film holes 100 extend from the leading edge cavity 96 through the suction side 74 opposite the cooling jet 98 of the airfoil 62 downstream of the leading edge 76. Cooling fluid travels from the leading edge cavity 96 through the film holes 100 to create a film of cooling fluid traveling over the suction surface of the airfoil 62 to shield the airfoil 62 from the high temperatures of the gas path traveling over the airfoil 62.

The radial dividing walls 102 are formed in the leading edge cavity 96 to ensure that the cooling fluid supplied through the cooling jet 98 is directed with a mean velocity vector 104 that is initially tangent and in a direction of maximum curvature of the first wall 97 of the leading edge cavity 96 adjacent the leading edge 76. The radial dividing walls 102 also isolate the flow of the cooling fluid in the leading edge cavity 96 such that radial flow induced through momentum transfer during rotation of the airfoil structure 60 is minimized to just the segmented cavities 96a, 96b, 96c, and 96d and not the entire length of the leading edge cavity 96.

In the illustrated example, the radial dividing walls 102 are generally perpendicular to the leading edge cavity 96 and the radial direction of the airfoil 62 and separate the leading edge cavity 96 into the segmented cavities 96a, 96b, 96c, and 96d. Although four segmented cavities are shown in FIG. 2, only two segmented cavities or more than four segmented cavities could be used in the leading edge cavity 96.

The leading edge cooling circuit 80 achieves increased cooling with reduced pressure drop by eliminating free-jet acceleration and subsequent momentum stagnation through increasing the velocity of the cooling fluid with the cooling jet 98 directed along the curvature of the first wall 97.

Figure 4:
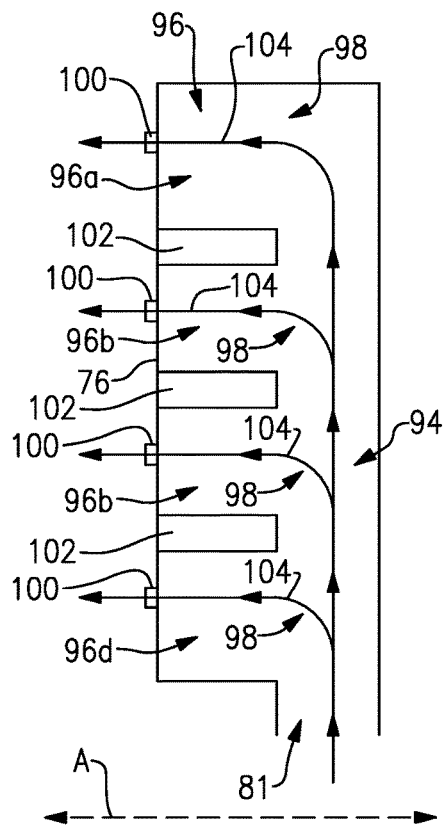
FIG. 4 is a schematic flow diagram of cooling fluid traveling through a leading edge cooling circuit.

A schematic view of the cooling fluid flowing through the leading edge cooling circuit 80 is shown in FIG. 4. The cooling fluid enters the leading edge cooling circuit 80 through the inlet 81 and then travels radially outward relative to the engine axis A into the radial feed cavity 94. As the cooling fluid is traveling through the radial feed cavity 94, a portion of the cooling fluid is directed into each of the segmented cavities 96a, 96b, 96c, and 96d of the leading edge cavity 96 through the cooling jets 98.

Once the cooling fluid enters the segmented cavities 96a, 96b, 96c, and 96d, the cooling fluid must exit through the film holes 100 in the leading edge 76 because the radial dividing walls 102 fluidly separate the segmented cavities 96a, 96b, 96c, and 96d from each other. As discussed above, the radial dividing walls 102 help to maintain the velocity vector 104 in the direction of maximum curvature along the segmented cavities 96a, 96b, 96c, and 96d and to reduce the radial flow induced through momentum transfer during rotation of the airfoil structure 60.

The pressure side cooling circuit 82 includes multiple passages extending in a general serpentine pattern along the pressure side 72 of the airfoil 62 (FIG. 2). The inlet 83 to the pressure side cooling circuit 82 extends through the root portion 66 and the platform 64 to direct cooling fluid from the compressor section 24 through the airfoil structure 60 into the pressure side cooling circuit 82.

The trailing edge cooling circuit 84 includes a radially extending passage 84a with multiple trailing edge passages 84b extending in a general axial direction through the trailing edge 78 (FIGS. 2 and 3). An inlet 85 to the trailing edge cooling circuit 84 extends through the root portion 66 and the platform 64 to direct cooling fluid from the compressor section 24 through the airfoil structure 60 into the pressure side cooling circuit 82.

The suction side cooling circuit 86 includes radially extending sections 88 (FIG. 3). An inlet 90 to the suction side cooling circuit 86 extends through the root portion 66 and the platform 64 to direct cooling fluid from the compressor section 24 through the airfoil structure 60 into the suction side cooling circuit 86. The central wall 106 separates the suction side cooling circuit 86 from the pressure side cooling circuit 82.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil for a gas turbine engine, the airfoil comprising:
   a wall having a leading edge and a trailing edge, and at least partially defining a boundary of a leading edge cavity radially along the leading edge, and a radially extending feed cavity;
   a cooling jet operatively associated with a portion of the wall proximate the leading edge and configured to direct a cooling fluid from the radially extending feed cavity to the leading edge cavity tangent to the portion of the wall; and
   at least one dividing wall separating the leading edge cavity into multiple segments and configured to minimize radial flow of the cooling fluid through the leading edge cavity, wherein the at least one dividing wall at least partially defines the cooling jet.

2. The airfoil of claim 1, wherein the at least one dividing wall is generally perpendicular to the radial direction of the airfoil.

3. The airfoil of claim 1, wherein the cooling jet is at least partially defined by a protrusion operatively disposed opposite the portion of the wall to form a channel therebetween configured to accelerate flow of the cooling fluid.

4. The airfoil of claim 3 wherein the portion of the wall includes a concave portion about the leading edge.

5. The airfoil of claim 4, wherein the concave portion follows a profile of the leading edge.

6. The airfoil of claim 3, wherein the radially extending feed cavity is in fluid communication with the channel.

7. The airfoil of claim 6, wherein the cooling jet includes an inlet adjacent the radially extending feed cavity and an outlet adjacent the leading edge cavity and the at least one dividing wall extends from the radially extending feed cavity to the leading edge.

8. The airfoil of claim 1, wherein the wall defines at least one film hole therethrough fluidly coupled to the leading edge cavity.

9. The airfoil of claim 1, further comprising a pressure side cooling circuit extending along a pressure side of the airfoil, a suction side cooling circuit extending along a suction side of the airfoil, and a trailing edge cooling circuit extending along a trailing edge of the airfoil.

10. The airfoil of claim 9, further comprising a central wall dividing the pressure side cooling circuit from the suction side cooling circuit.

11. A gas turbine engine assembly, comprising:
    a rotor configured to rotate about an axis of rotation; and
    an airfoil including:
       a wall having a leading edge and a trailing edge, and at least partially defining a boundary of a leading edge cavity radially along the leading edge, and a radially extending feed cavity;
       a cooling jet operatively associated with a portion of the wall proximate the leading edge and configured to direct a cooling fluid from the radially extending feed cavity to the leading edge cavity tangent to the portion of the wall; and
       at least one dividing wall separating the leading edge cavity into multiple segments and configured to minimize radial flow of the cooling fluid through the leading edge cavity, wherein the at least one dividing wall at least partially defines the cooling jet.

12. The assembly of claim 11, wherein the at least one dividing wall is generally perpendicular to the radial direction of the airfoil.

13. The assembly of claim 11, wherein the cooling jet is at least partially defined by a protrusion operatively disposed opposite the portion of the wall to form a channel therebetween configured to accelerate flow of the cooling fluid.

14. The assembly of claim 13, wherein the radially extending feed cavity is in fluid communication with the channel.

15. The assembly of claim 14, wherein the cooling jet includes an inlet adjacent the radial feed cavity and an outlet adjacent the leading edge cavity and the at least one dividing wall extends from the radially extending feed cavity to the leading edge.

16. A method of cooling an airfoil in a gas turbine engine, comprising:
    directing a cooling fluid through a cooling jet from a radially extending feed cavity to a leading edge cavity in a direction tangential to a portion of a wall of the leading edge cavity extending along a leading edge of the airfoil; and
    separating the leading edge cavity into multiple segments configured to minimize radial flow of the cooling fluid through the leading edge cavity with at least one dividing wall, wherein the at least one dividing wall at least partially defines the cooling jet.

17. The method of claim 16, wherein the at least one dividing wall extends generally perpendicular to the radial direction of the airfoil.

18. The method of claim 16, wherein the cooling jet is at least partially defined by a protrusion operatively disposed opposite the portion of the wall to form a channel therebetween configured to accelerate flow of the cooling fluid.

19. The method of claim 16, wherein the at least one dividing wall extends from the radially extending feed cavity to the leading edge.

* * * * *